(12) United States Patent
Rocca (10) Patent No.: US 8,746,360 B2
(45) Date of Patent: *Jun. 10, 2014

(54) PLASTIC MULCH RETRIEVERS

(75) Inventor: Antonio Roberto Rocca, Tolga (AU)

(73) Assignee: Rocca Manufacturing Pty Ltd (AU)

( * ) Notice: Subject to any disclaimer, the term of this patent is extended or adjusted under 35 U.S.C. 154(b) by 395 days.

This patent is subject to a terminal disclaimer.

(21) Appl. No.: 13/045,342

(22) Filed: Mar. 10, 2011

(65) Prior Publication Data

US 2011/0209885 A1  Sep. 1, 2011

Related U.S. Application Data

(63) Continuation-in-part of application No. 12/808,601, filed as application No. PCT/AU2008/001916 on Dec. 17, 2008, now Pat. No. 8,302,699.

(30) Foreign Application Priority Data

Dec. 17, 2007 (AU) ................................ 2007906889
Oct. 15, 2008 (AU) ................................ 2008905335

(51) Int. Cl.
    *A01G 13/02*    (2006.01)
(52) U.S. Cl.
    USPC .......................................................... 171/45
(58) Field of Classification Search
    USPC ...................... 171/53, 1, 45, 62, 74, 83, 138;
    172/19–21, 33, 50, 63; 100/7, 18, 91,
    100/100, 138, 139, 180, 187, 189, 250;
    414/786, 501, 502, 523, 518, 528,
    414/525.2
    See application file for complete search history.

(56) References Cited

U.S. PATENT DOCUMENTS

| | | | | |
|---|---|---|---|---|
| 3,175,621 A | * | 3/1965 | Kappelmann et al. | 171/53 |
| 3,181,455 A | * | 5/1965 | Gouker et al. | 100/97 |
| 4,294,316 A | * | 10/1981 | Hedley et al. | 172/20 |
| 4,796,711 A | | 1/1989 | Chrysler | |
| 4,953,482 A | * | 9/1990 | Emily | 111/144 |
| 5,236,051 A | | 8/1993 | Sawyer et al. | |
| 5,386,876 A | | 2/1995 | Lavo | |
| 5,452,652 A | * | 9/1995 | Brooks | 100/7 |
| 7,721,814 B2 | * | 5/2010 | Brouwer et al. | 172/20 |

FOREIGN PATENT DOCUMENTS

| | | |
|---|---|---|
| FR | 2703212 A1 | 10/1994 |
| FR | 2706734 A1 | 12/1994 |
| FR | 2735654 A1 | 12/1996 |
| JP | 3-262422 A | 11/1991 |

OTHER PUBLICATIONS

Printed in the Chinese Selected Master's Dissertations Theses Full-Text Databases, Mar. 1, 2005, 56 pages, No. 20050301.

* cited by examiner

*Primary Examiner* — Robert Pezzuto
(74) *Attorney, Agent, or Firm* — Standley Law Group LLP (57) ABSTRACT

A plastic mulch retriever comprises a body and at least one set of cutting or digging elements mounted to the body to loosen plastic mulch embedded in the ground. At least one conveyor is mounted to the body rearward of the at least one set of cutting or digging elements. The conveyor engages the loosened plastic mulch and removes at least some of the ground material attached to the extracted plastic mulch. At least one storage device can be mounted to the body rearward of the conveyor to store the retrieved plastic mulch. Embodiments of the plastic mulch retriever comprise multiple sets of cutting or digging elements and multiple respective conveyors.

20 Claims, 6 Drawing Sheets

PLASTIC MULCH RETRIEVERS

CROSS-REFERENCE TO RELATED APPLICATIONS

This application is a continuation-in-part of U.S. patent application Ser. No. 12/808,601 filed Jun. 16, 2010, which is a national stage filing of International Patent Application No. PCT/AU2008/001916 filed Dec. 17, 2008, which claims priority to Australian Patent Application No. 2007906889 filed Dec. 17, 2007 and Australian Patent Application No. 2008905335 filed Oct. 15, 2008, each of which is hereby incorporated by reference in its entirety.

FIELD OF THE INVENTION

Embodiments of the present invention relate generally to agricultural machinery. In particular, embodiments of the present invention relate to plastic mulch retrievers or extractors.

BACKGROUND TO THE INVENTION

Agricultural machinery is commonly used by farmers, crop growers and others to improve the efficiency of planting and harvesting crops. Some crops are grown with the aid of irrigation systems, such as trickle irrigation, and plastic sheeting known as plastic mulch, which are at least partially embedded in the ground at the start of the growing period. Plastic mulch provides a range of benefits including helping modulate soil temperature, reduce soil erosion, evaporation, fertilizer leaching and weed problems and increase produce quality and yields.

When the crops are harvested, the plastic mulch and often the irrigation system need to be removed from the ground for disposal. Plastic mulch retrievers are agricultural machines designed for this purpose and are typically drawn behind a powered vehicle, such as a tractor. Plastic mulch retrievers are available in a range of designs, the main features of which will now be discussed.

One known plastic mulch retriever comprises a pair of coulter wheels at a front end, which cut into the ground and plant matter, such as roots. A pair of angled, substantially horizontal blades mounted rearward of the coulter wheels also cut into the ground and underneath the plastic mulch embedded in the ground. As the mulch retriever is pulled along behind the powered vehicle, the mulch is unearthed and left lying loosely on top of the planting bed. A centre coulter wheel rearward of the pair of coulter wheels slices the plastic mulch into two halves. The positions of the coulter wheels are adjustable to accommodate different size planting beds. One drawback of this mulch retriever is that the unearthed mulch needs to be collected for disposal, which is labour intensive and therefore costly as well as inefficient because the unearthed mulch remains strewn along the growing area.

A modification to the aforementioned mulch retriever comprises a plurality of propane burners rearward of the coulter wheels and angled blades. The burners incinerate the unearthed mulch thus avoiding the need to collect the unearthed mulch. However, incineration is environmentally unfriendly and illegal in some jurisdictions. The burners also require a propane tank, which adds to the both the financial and environmental cost.

In another plastic mulch retriever design, the unearthed mulch is rolled onto a pair of aligned, rotating rollers rotatably mounted toward a rear of the mulch retriever on a pair of longitudinal arms. In some versions, an operator stands on a platform to control the speed of rotation of the rollers to be commensurate with the speed of the powered vehicle and the rate at which the mulch is being unearthed. Once all of the mulch has been retrieved or the rollers are full, each arm comprising one of the respective rollers is swung outwardly and the rollers separate about a substantially central point allowing the retrieved mulch bundle wrapped around the rollers to fall to the floor for disposal.

Whilst the aforementioned plastic mulch retriever is effective at retrieving the embedded mulch, one problem that is experienced is the plastic mulch retains a lot of soil, roots, debris and the like. It is desirable to minimize the amount of earth removed during plastic mulch retrieval to minimize the amount of nutrients removed from the soil. The earth attached to the removed mulch also adds to the weight of the bundle for disposal. Furthermore, the capacity of the rollers for capturing the plastic mulch is reduced because the attached earth occupies some of the volume. It will be appreciated that clods of earth, debris and the like occupy significantly more volume than plastic sheeting. Therefore, efficiency is affected because more stops must be made to empty the rollers than would otherwise be necessary. Irrespective of the problem of the retained debris, at least some of these rollers have a relatively small capacity for collecting the mulch resulting in many stops being required to empty the rollers. This inefficiency is exacerbated with large areas. Furthermore, plastic mulch retrievers comprising rollers for storing the retrieved mulch have proved difficult to operate across multiple rows.

OBJECT OF THE INVENTION

It is an object of the present invention to provide a plastic mulch retriever that addresses or at least ameliorates one or more of the aforementioned problems of the prior art or provides consumers with a useful commercial alternative.

SUMMARY OF THE INVENTION

According to one aspect, although not necessarily the broadest or only aspect, embodiments of the present invention reside in a plastic mulch retriever comprising:
 a body;
 at least one set of cutting or digging elements mounted to the body to loosen plastic mulch embedded in the ground;
  at least one conveyor mounted to the body rearward of the at least one set of cutting or digging elements to engage the plastic mulch loosened by the at least one set of cutting or digging elements and remove at least some of the ground material attached to the extracted plastic mulch. The plastic mulch retriever may comprise at least two sets of cutting or digging elements mounted to the body and at least two conveyors mounted to the body, each conveyor mounted rearward of a respective set of cutting or digging elements.

Preferably, one of the sets of cutting or digging elements and a respective conveyor are mounted to the body adjacent another set of cutting or digging elements and a respective conveyor.

Suitably, one of the sets of cutting or digging elements is offset in a longitudinal direction with respect to another set of cutting or digging elements.

Suitably, the at least two conveyors are mounted to the body adjacent each other.

Suitably, one of the conveyors is offset in a longitudinal direction with respect to an adjacent conveyor.

According to some embodiments, the plastic mulch retriever comprises three sets of cutting or digging elements and three respective conveyors mounted to the body rearward of a respective set of cutting or digging elements.

Suitably, a central set of cutting or digging elements is offset in a longitudinal direction with respect to the other sets of cutting or digging elements on either side.

Suitably, a central conveyor is offset in a longitudinal direction with respect to the other conveyors on either side.

Preferably, the conveyor comprises a plurality of substantially transverse bars comprising one or more projections for engaging the loosened plastic mulch.

Alternatively, the substantially transverse bars engage the loosened plastic mulch.

Suitably, the at least one cutting or digging element comprises one or more substantially vertically mounted coulter wheels and/or one or more substantially horizontally mounted angled cutting blades.

Suitably, the at least one cutting or digging element comprises one or more blades substantially aligned with elongate side members of the body and angled toward the ground.

Suitably, the plastic mulch retriever further comprises at least one storage device mounted to the body rearward of the at least two conveyors to store the extracted plastic mulch.

Suitably, the plastic mulch retriever further comprises at least two storage devices mounted to the body rearward of a respective one of the at least two conveyors to store the extracted plastic mulch from a respective conveyor.

Preferably, the storage device comprises a pair of rollers rotatably mounted to the body, the pair of rollers releasably connected by a locking mechanism.

Preferably, the retrieved plastic mulch passes first over the top of the rollers and then underneath the rollers as the plastic mulch is wrapped around the rollers.

Suitably, a speed of rotation of the rollers is adjustable and is adjusted according to a speed of the plastic mulch retriever and/or a diameter of a bundle of mulch on the rollers.

Preferably, one or more of the following are adjustable: a position at which the conveyor is mounted to the body; a height of the conveyor relative to the body and the ground; an angle of inclination of the conveyor relative to the body.

Preferably, the body comprises a pair of spaced apart elongate side members, at least one of the elongate side members being in two parts joined together by a hinge allowing one part to which one of the rollers is mounted to pivot relative to the other part.

Suitably, the at least two conveyors are driven by a single motor or by a pair of motors, each motor driving a respective conveyor.

Further features and aspects of the present invention will become apparent from the following detailed description.

BRIEF DESCRIPTION OF THE DRAWINGS

Embodiments of the present invention will now be described with reference to the accompanying drawings, which are provided by way of example only, wherein.

DETAILED DESCRIPTION OF THE INVENTION

Like features in the drawings are identified by like reference numerals. It should be appreciated that in order to aid clarity, the plastic mulch has been omitted from FIGS. 1-3 and 5-6. However, the plastic mulch is shown in the schematic drawing in FIG. 4.

Figure 1:
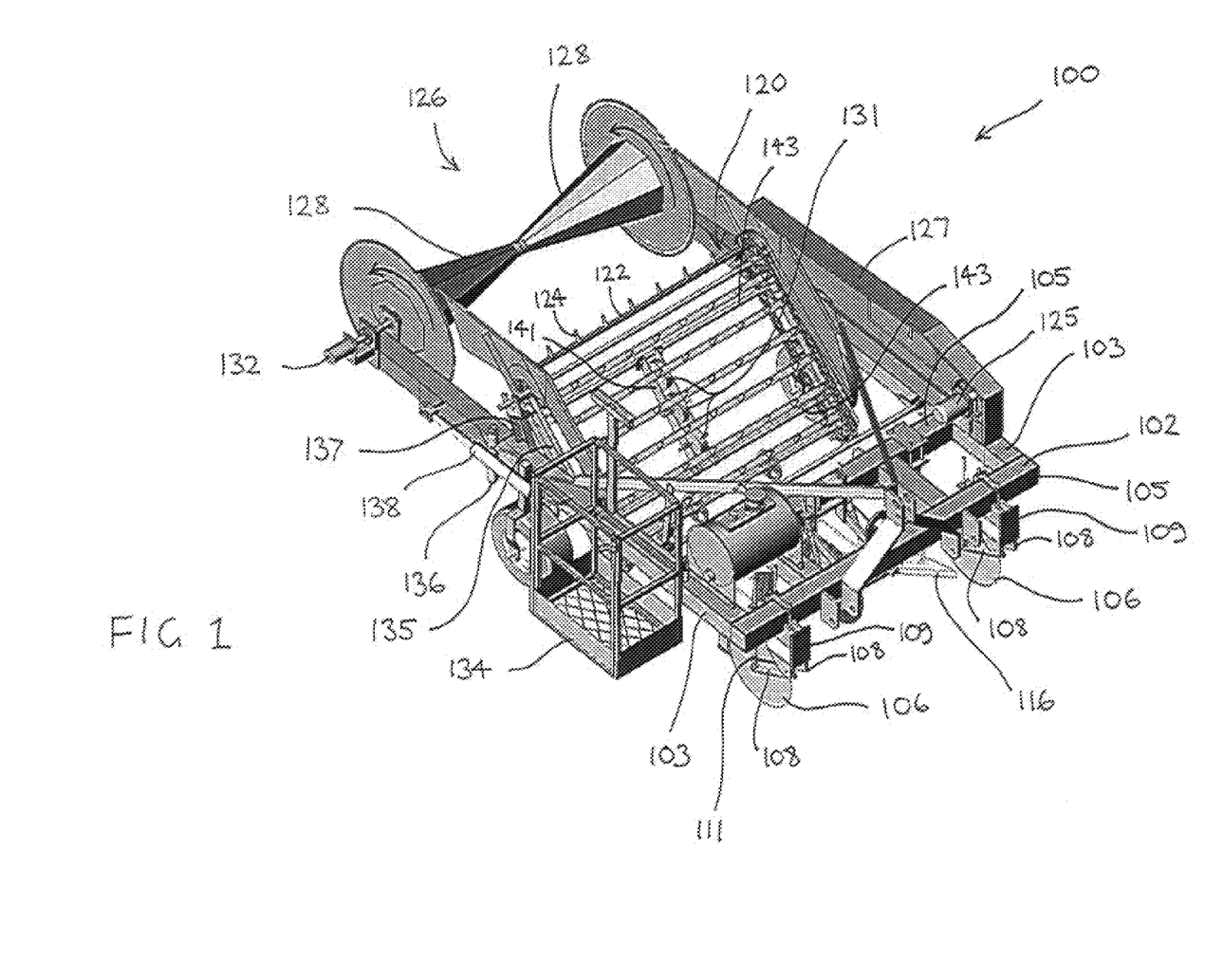
FIG. 1 is top side perspective view of a plastic mulch retriever according to some embodiments of the present invention.
Figure 2:
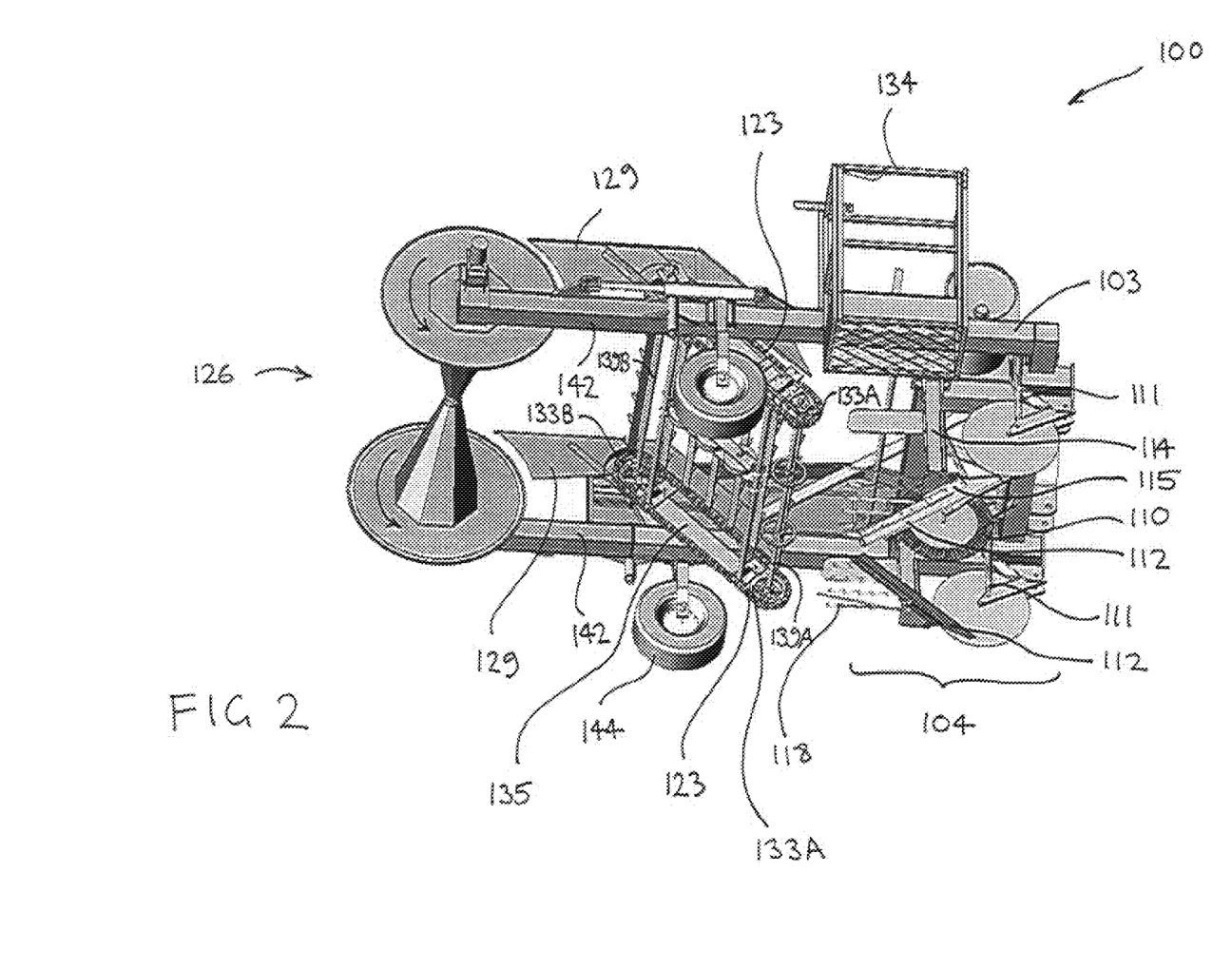
FIG. 2 is an underside perspective view of the plastic mulch retriever shown in FIG. 1.
Figure 3:
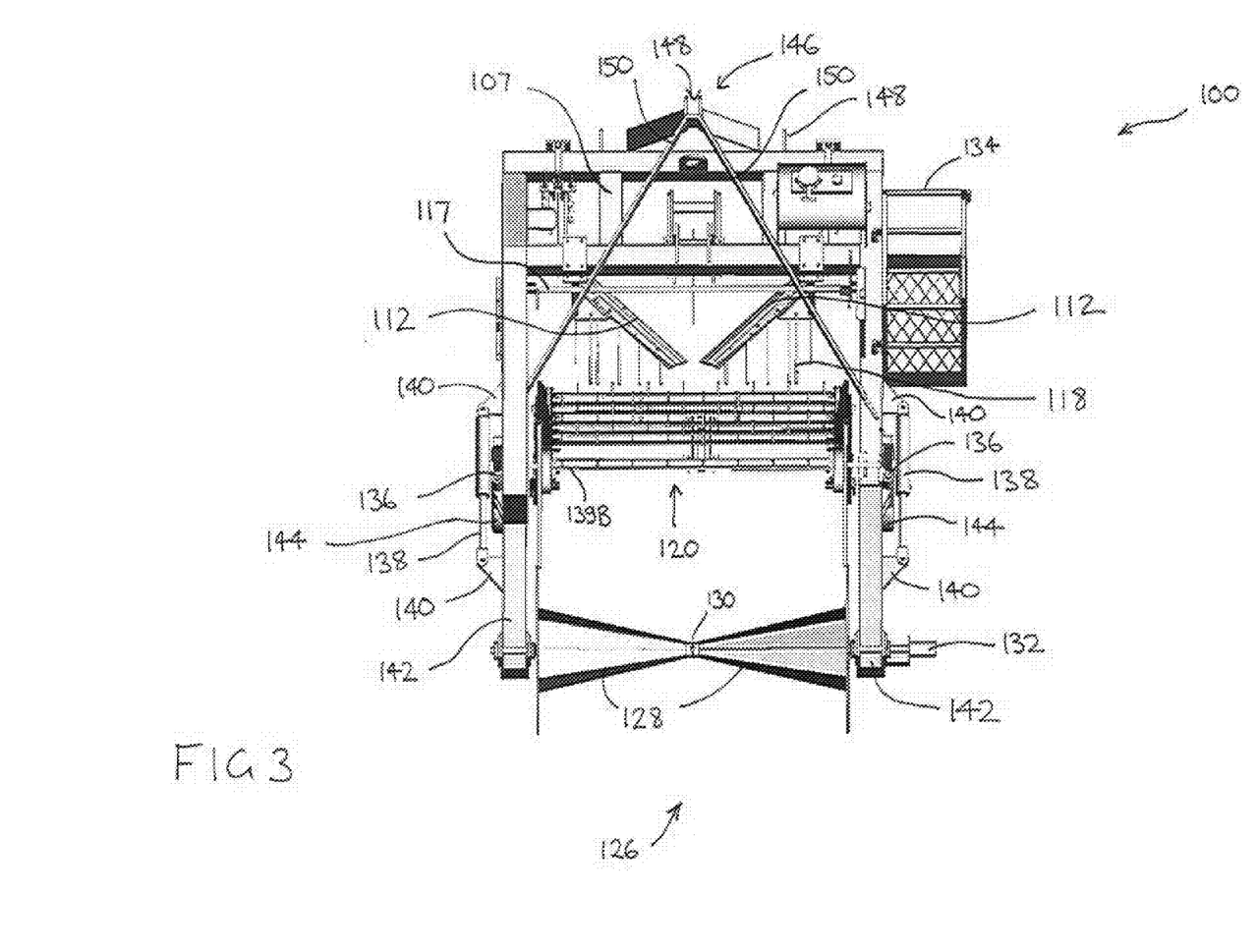
FIG. 3 is a plan perspective view of the plastic mulch retriever shown in FIG. 1.

With reference to FIGS. 1-3, a plastic mulch retriever 100 in accordance with embodiments of the present invention comprises a body 102 formed from any suitable grade steel or similar material familiar to the skilled addressee. According to some embodiments, the body 102 is formed from a plurality of elongate members having a hollow box frame construction. In the embodiment shown, the body 102 comprises a pair of spaced apart elongate side members 103 welded, bolted or otherwise attached to a pair of spaced apart elongate transverse members 105. Shorter elongate members 107 are attached substantially perpendicular to and between elongate transverse members 105 to provide increased structural integrity and rigidity to the body 102.

The plastic mulch retriever 100 comprises at least one, and in preferred embodiments, a plurality of, cutting or digging elements 104 mounted to the body 102 to loosen and extract plastic mulch embedded in the ground. According to some embodiments, the cutting or digging elements 104 comprise at least one, typically a pair, and in some embodiments, three or more, substantially vertically mounted coulter wheels 106. Coulter wheels 106 cut into the ground and define a channel of ground from which the plastic mulch will be retrieved. In the embodiment shown in FIGS. 1-3, a pair of coulter wheels 106 are provided, each coulter wheel rotatably mounted at the end of, and between, a pair of respective arms 108. Arms 108 are rotatably mounted to a respective bracket 109, each of which is adjustably mounted to a forward one of the elongate transverse members 105. Adjustable mounting of the brackets 109 can be provided by any suitable clamping arrangement. Suspension for each coulter wheel 106 is provided by a pair of rod mounted springs 111, one rod mounted spring 111 provided either side of the coulter wheel 106 and extending between the arms 108 and their respective bracket 109. The separation of the coulter wheels 106 provided either side of the body 102 along forwardmost transverse member 105 can be adjusted according to the size of the planting bed.

As shown most clearly in FIG. 2, according to some embodiments, a third coulter wheel 110 is rotatably mounted to one of the elongate transverse members 105 of the body 102 in a substantially central location of the body 102. Third coulter wheel 110 is rotatably mounted to the body 102 via respective arms 108, a respective bracket 109, and a respective pair of rod mounted springs 111 as described above in relation to coulter wheels 106. In this embodiment, third coulter wheel 110 is mounted substantially centrally to the rearmost transverse member 105.

Coulter wheels 106 cut plant matter such as roots and the like and other debris in the path of the mulch retriever 100 and coulter wheel 110 cuts the extracted plastic mulch along its length for improved manipulation by the mulch retriever 100.

As most clearly shown in FIGS. 2 and 3, the cutting or digging elements 104 can also comprise one or more substantially horizontally mounted, angled cutting blades 112. In the embodiment shown, a pair of cutting blades 112 are mounted to one of the elongate transverse members 105 of the body 102 via a respective downwardly extending elongate support 114 comprising angled mounting bracket 115. Cutting blades 112 are angled with respect to each other and comprise self-cleaning, angled cutting edges 116, shown most clearly in FIGS. 1 and 3. A plurality of guides 118 in the form of steel rods of differing lengths extend from and rearward of the cutting blades 112 and the angled mounting bracket 115 to guide the extracted plastic mulch rearward of the cutting blades 112 as the mulch retriever 100 moves forward.

The pair of coulter wheels 106 (and optionally central coulter wheel 110) and angled cutting blades 112 can be considered as a set of cutting or digging elements 104.

In alternative embodiments, the cutting blades 112 can be replaced with a series of blades angled toward the ground. The series of blades is substantially aligned with the elongate side members 103 and mounted to, for example, transverse member 117 extending between the elongate side members 103. Such an arrangement is known in the art as European shears. In a further alternative, instead of the series of blades, a single blade is provided extending substantially across the width of the body 102 between the elongate side members 103.

Mulch retriever 100 also comprises a conveyor 120 mounted to the elongate side members 103 of the body 102 rearward of the cutting or digging elements 104 to engage the extracted plastic mulch and remove at least some, preferably a substantial amount, if not most or all, of the ground material attached thereto. According to some embodiments, the mounting position of the conveyor 120 along the elongate side members 103, and thus the distance of the conveyor from the 120 from the cutting or digging elements 104, is adjustable. According to the embodiment shown in FIGS. 1-3, the conveyor 120 comprises a plurality of substantially transverse bars 122, referred to as rattler bars, attached at each end thereof at spaced intervals to looped chains 123. In the drawings, the transverse bars 122 on an underside of the chains 123 have been omitted for the sake of clarity. However, it should be appreciated that the transverse bars 122 are also present on the underside of the chains 123. The bars 122 comprise one, or more preferably a plurality of, projections 124 in the form of angled teeth at spaced apart intervals along the length of the bars 122 for engaging the extracted plastic mulch.

Looped chains 123 are engaged by a forward pair of spaced apart toothed wheels 133A and a rearward pair of spaced apart toothed wheels 133B mounted to respective axles 139A, 139B, which are rotatably mounted to a conveyor frame 135. Conveyor frame 135 is mounted at an angle to the elongate side members 103 by mounting brackets 137 on both sides of the conveyor 120. The conveyor 120 is driven by a motor 125 and a belt arrangement that is concealed in or behind a housing 127 for safety. The belt drive also reduces the operating noise of the mulch retriever 100. The belt is coupled to, and drives, axle 139B to which rearward pair of spaced apart toothed wheels 133B are mounted to drive the conveyor 120. Guards 129 are provided either side of the conveyor 120 mounted to the conveyor frame 135, also for safety purposes. Guards 129 cover the looped chains 123 and a space rearward of the conveyor 120.

The conveyor 120 vibrates to aid removal of soil, earth, stones and other debris attached to the plastic mulch. The level or degree of vibration is determined by three substantially aligned wheels 131 in the centre of the conveyor. The bars 122 roll over the wheels 131 and are thus vibrated. The level of vibration is determined by the height of the wheels 131, which is adjustable. Wheels 131 are rotatably mounted to a pair of arms 141, which are mounted to transverse members 143 of the conveyor frame 135.

The conveyor 120 is inclined at an angle relative to the elongate side members 103 and conveys the plastic mulch from just above ground level at a front of the conveyor 120 to well above ground level toward a rear of the conveyor 120 and the mulch retriever 100. The conveyor 120 is positioned such that the projections 124 of the rattler bars 122 engage and effectively rake the ground. According to some embodiments, the angle and height of the conveyor 120 are also adjustable to suit the terrain from which the mulch is being retrieved.

According to some embodiments, the projections 124 are omitted from the rattler bars 122 and the rattler bars 122 engage and effectively rake the ground directly. The adjustable angle and height of the conveyor 120 enable the degree of engagement of the rattler bars 122 with the ground to be varied, for example, according to the hardness of the ground and the depth of the mulch beneath the surface.

In these embodiments, the plastic mulch loosened and at least partially extracted from the ground by the cutting and digging elements 104 is captured by the conveyor 120. Soil and other debris such as plant matter are removed from the plastic mulch by the rearward movement and vibration of the conveyor. The soil and debris is substantially evenly deposited on the ground in the plating beds as the plastic mulch retriever 100 moves along. The plastic mulch minus a large proportion, if not all, of the soil and debris is deposited on the ground behind the conveyor 120 for collection by a vehicle, such as a tractor, or by manual labour.

According to other embodiments, toward a rear of the mulch retriever 100, at least one storage device 126 is mounted to the body 102 rearward of the conveyor 120 to store the retrieved plastic mulch. According to the embodiment shown in FIGS. 1-3, the storage device 126 is in the form of a pair of aligned, rotatably mounted rollers 128 as is known from the prior art. The rollers 128 are substantially conical in shape and rotatably mounted with their points facing each other. The rollers 128 releasably lock together at their points via a locking mechanism 130 and are separable when they are full to allow the bundle of retrieved mulch material to fall to the ground or otherwise be removed therefrom. As the plastic mulch leaves the conveyor 120, it is tied to and wrapped around the rotating rollers 128. The rollers 128 are rotated by a motor 132 at a speed dependant on the speed of the powered vehicle (not shown) pulling the mulch retriever 100 and the diameter of the bundle of mulch on the rollers 128. The speed of rotation of the rollers is variable. For example, if the mulch retriever 100 is moving along at a constant speed, as the diameter of the retrieved bundle of mulch wrapped around the rollers 128 increases, the speed of rotation of the rollers 128 is reduced.

Figure 4:
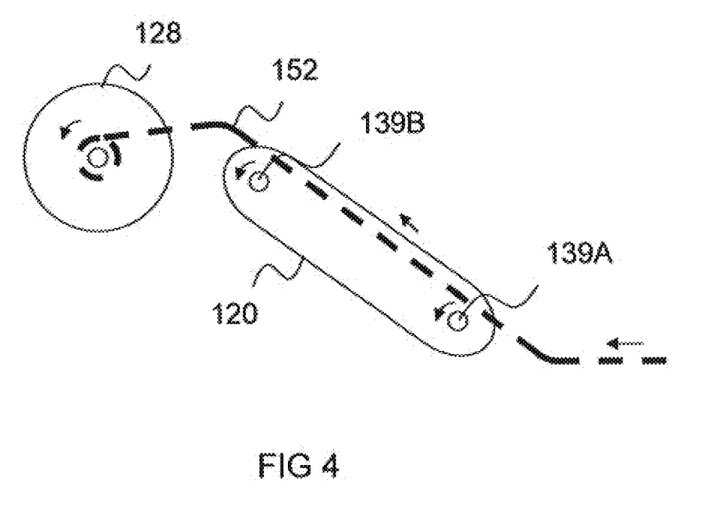
FIG. 4 is a schematic side view showing the plastic mulch passing through the plastic mulch retriever shown in FIG. 1.

With additional reference to FIG. 4, in contrast to some of the prior art devices, in embodiments of the present invention, rearward of the conveyor 120, the plastic mulch 152 passes first over the top of the rollers 128 of the storage device 126 and then underneath the rollers 128 as the plastic mulch 152 is wrapped around the rollers 128. When the mulch retriever 100 is viewed from the left hand side with the front of the mulch retriever 100 on the right hand side, as shown in FIG. 4, the rollers 128 at the rear rotate in an anticlockwise direction as indicated by the arrow shown on the side of the rollers 128. It will be appreciated that when the mulch retriever 100 is viewed from the right hand side with the front of the mulch retriever 100 on the left hand side, the rollers 128 rotate in a clockwise direction. The inventor has identified that passing the plastic mulch 152 first over the top of the rollers 128 of the storage device 126 enables more debris to fall from the plastic mulch, for example, from the rear of the mulch retriever 100, before the plastic mulch 152 is wrapped around the rollers 128. In some of the prior art devices, the plastic mulch first passes underneath the rollers and the debris becomes trapped between the plastic mulch and the rollers 128 or previously wound layers of plastic mulch and is bundled up with the plastic mulch as the rollers rotate. Therefore, in embodiments of the present invention, more dirt is removed from the plastic mulch compared with at least some of the prior art devices.

The speeds of the motor 132 and the motor 125 for driving the conveyor 120 are controlled by an operator standing in the compartment 134 mounted to one of the elongate side members 103 of the body 102. Compartment 134 can be made from suitable members, preferably made of steel or other suitable metal, bolted or welded together, a perforated base and a hinged gate to allow access to the compartment. Motors 125, 132 can be hydraulic motors driven by a hydraulic pump and circuit or can be implemented by suitable gearing.

To enable the rollers 128 to be separated when they are full or to otherwise remove the bundle of retrieved mulch, each elongate side member 103 is provided in two parts and joined together by a hinge 136. A hydraulic ram 138 is provided on the outside of each elongate side member 103 and is rotatably coupled at each end to a respective elongate side member 103 via brackets 140. Once motor 132 driving the rollers 128 has been stopped, locking mechanism 130 is released and hydraulic rams 138 are retracted such that end portions 142 of the elongate side members 103 pivot outwardly about hinges 136. Rollers 128 separate and the bundle of retrieved mulch falls to the ground or can be removed from one of the rollers. Although the embodiment shown in the drawings comprises each elongate side member 103 being provided in two parts and joined together by a respective hinge 136, it is envisaged that in alternative embodiments just one side member 103 is provided in two parts and joined together by a hinge 136 such that only one elongate side member 103 pivots outwardly to allow the bundle of retrieved mulch to be removed or fall to the ground.

A pair of wheels 144 are rotatably mounted to the elongate side members 103 by any suitable means to provide support for the mulch retriever 100. A hitch arrangement 146 comprising a plurality of hitching brackets 148 is welded to a forward one of the elongate transverse members 105 to facilitate hitching of the mulch retriever 100 to one of a range of powered vehicles with different hitch attachments, such as a tractor (not shown). Strengthening bars 150 extend substantially diagonally between the hitch arrangement 146 and the elongate side members 103 and are welded thereto.

Alternative embodiments of the plastic mulch retriever will now be described with reference to FIGS. 5 and 6.

Figure 5:
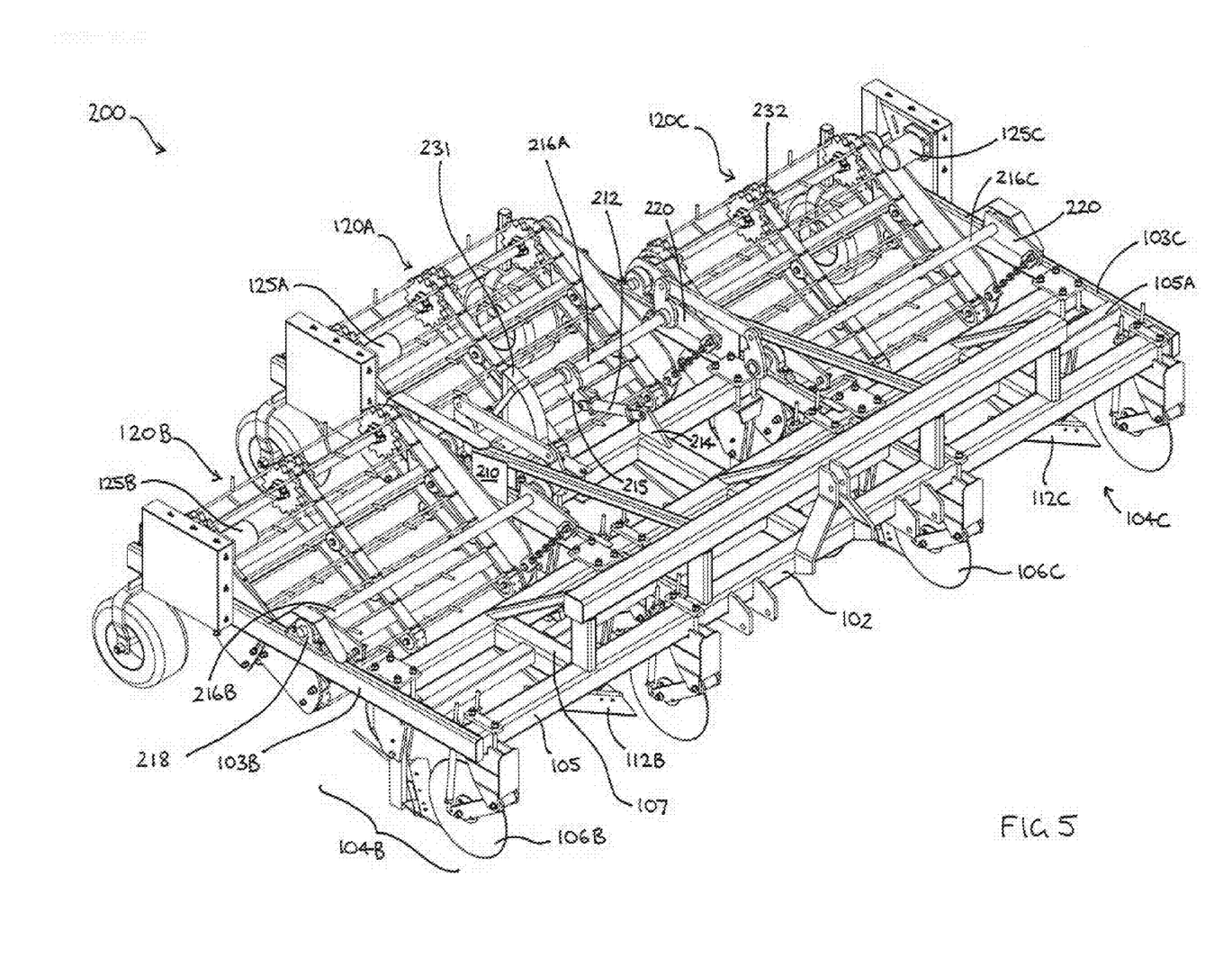
FIG. 5 is a left side front perspective view of a plastic mulch retriever according to alternative embodiments of the present invention.

Referring to FIG. 5, according to alternative embodiments, the plastic mulch retriever 200 comprises at least two sets of cutting or digging elements 104 mounted to the body 102 and at least two conveyors 120 mounted to the body. Each conveyor 120 is mounted rearward of a respective set of the cutting or digging elements 104. In the particular embodiment shown in FIG. 5, the plastic mulch retriever 200 comprises three sets of cutting or digging elements 104 mounted to the body 102 and three respective conveyors 120 mounted to the body 102 rearward of a respective set of cutting or digging elements. The plastic mulch retriever 200 is thus capable of retrieving plastic mulch from multiple rows of planting beds simultaneously resulting in increased efficiency compared with single row versions.

Figure 6:
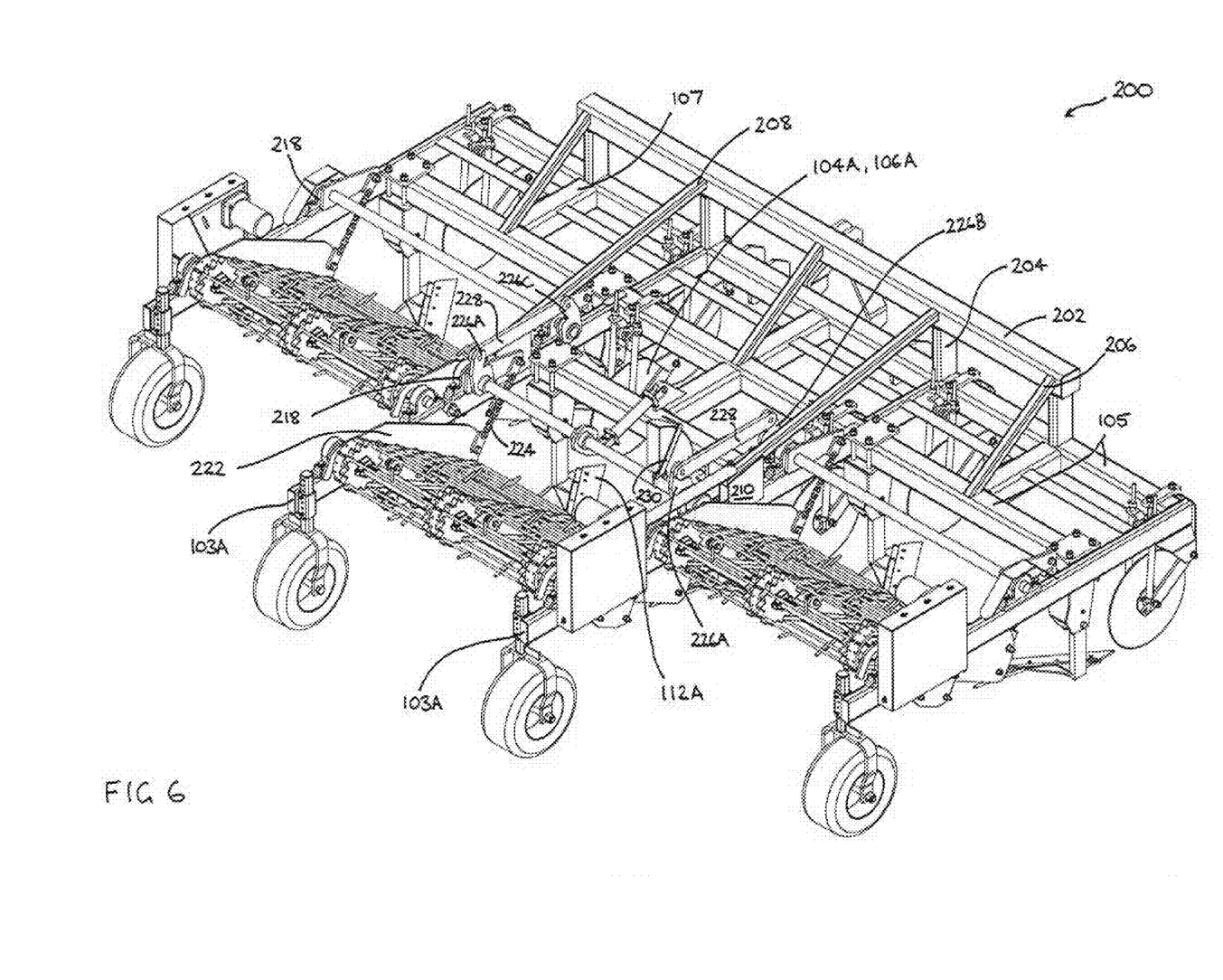
FIG. 6 is a left side rear perspective view of the plastic mulch retriever shown in FIG. 5.

As shown more clearly in FIG. 6, at least one of the sets of cutting or digging elements 104A is offset in a longitudinal direction of the plastic mulch retriever with respect to another set of cutting or digging elements. In the embodiment shown, a central set of cutting or digging elements 104A is offset in a longitudinal direction with respect to the other two sets of cutting or digging elements 104B, 104C on either side of the central set. The coulter wheels 106A and the angled cutting blades 112A of the central set of cutting or digging elements 104A are rearward of the coulter wheels 106B, 106C and the angled cutting blades 112B, 112C of the sets of cutting or digging elements 104B, 104C on the left and on the right respectively of the central set.

In this embodiment, one of the conveyors 120 is offset in a longitudinal direction of the plastic mulch retriever 200 with respect to an adjacent conveyor. In the embodiment shown, a central conveyor 120A is offset in a longitudinal direction with respect to the other two conveyors 120B, 120C. Central conveyor 120A is rearward of the conveyors 120B, 120C on the left and on the right respectively of the central conveyor 120A.

The offsetting of the central conveyor 120A in a rearward direction is achieved by elongate side members 103A of hollow box construction being of greater length than elongate side members 103B, 103C.

It should be appreciated that the offsetting of the cutting or digging elements 104 and/or the conveyors 120 in these embodiments is not limited to the configuration shown in FIGS. 5 and 6. For example, cutting and digging elements 104C and/or conveyor 120C can be further rearward of central cutting and digging elements 104A and/or central conveyor 120A.

It should be appreciated that in the embodiments shown in FIGS. 5 and 6, offsetting of the cutting or digging elements 104 and/or the conveyors 120 is not essential. In such embodiments, the sets of cutting or digging elements 104 can be mounted to the body 102 adjacent another set of cutting or digging elements. Similarly, the at least two conveyors can be mounted to the body adjacent each other. For example, all three sets of cutting or digging elements 104A-104C can be aligned with each other transversely and/or all three conveyors 102A-120C can be aligned with each other transversely.

Each conveyor 120A, 120B, 120C is driven by a respective motor 125A, 125B, 125C. The motors can be hydraulic, pneumatic or can be implemented using suitable gearing. In a preferred embodiment, the motors 125A, 125B, 125C are hydraulic and are driven by a common hydraulic line from the powered vehicle, such as a tractor, pulling the plastic mulch retriever 200. Motors 125A, 125B, 125C are driven at the same speed so the conveyors move at the same rate as the plastic mulch retriever is pulled along. It will be appreciated that in alternative embodiments, motors 125A, 125B, 125C can be replaced by a single motor of appropriate power.

Compared with earlier single row embodiments of the plastic mulch retriever 100 described herein, elongate transverse members 105 are of greater length according to the number of rows for which the plastic mulch retriever 200 is designed. Additional, shorter transverse members 105A of smaller cross section than transverse members 105 are provided between elongate transverse members 105. Transverse members 105A are also attached to elongate members 107 attached perpendicular to and between elongate transverse members 105.

Body 102 comprises elongate transverse member 202, also of hollow box frame construction, which is attached to elongate transverse members 105 via substantially vertical elongate members 204. Angled supports 206 are coupled between elongate transverse member 202 and one of the elongate transverse members 105. Longer angled supports 208 are coupled to elongate transverse member 202 and to elongate side members 103A via metal plates 210.

Shorter transverse members 105A, elongate transverse member 202, vertical elongate members 204, angled supports 206, 208 and metal plates 210 provide increased structural integrity and rigidity of the body 102, which is considerably larger for the multiple row versions of the plastic mulch retriever 200 compared with the body 102 for the single row versions.

The height of the conveyors 120, and therefore the angle of inclination of the conveyors 120, is controlled by hydraulic ram 212 coupled to conveyor 120A. One end of the ram 212 is mounted to one of the elongate transverse members 105 and one of the longitudinal elongate members 107 via a support 214. The other end of the ram 212 is pivotally coupled to a lever 215 mounted to substantially transverse tube 216A. Tube 216A is rotatably mounted at each end thereof to the body 102 via mountings 218. At or toward one end thereof, an arm 220 is directly or indirectly coupled to each end of the tube 216A and extends therefrom. At or toward an opposite end thereof, each arm 220 is coupled to a side wall 222 of the conveyor 120A via a linkage 224, such as a chain.

Conveyors 120B and 120C either side of the central conveyor 120A comprise substantially the same arrangement comprising tubes 216B, 216C rotatably mounted to mountings 218 and having arms 220 coupled to each end of the tubes 216B, 216C and to side walls 222 of the conveyors 120B, 120C via linkages 224.

Tube 216A of the central conveyor 120A is coupled to tubes 216B, 216C of conveyors 120B and 120C either side thereof via levers 226A, 226B, 226C and rods 228. Levers 226A are mounted to both ends of tube 216A and levers 226B, 226C are respectively mounted to one end of tubes 216B, 216C. Rods 228 pivotally couple levers 226A to levers 226B, 226C.

Hence, when ram 212 is extended, tube 216A of the central conveyor 120A rotates causing arms 220 and thus conveyor 120A to lower. Levers 226A, 226B, 226C and rods 228 cause conveyors 120B, 120C to lower simultaneously. Retracting ram 212 causes conveyors 120A, 120B, 120C to rise simultaneously.

The height of the conveyors is communicated, for example to the driver of the tractor, via level indicator 230 coupled to tube 216A, which indicates a level on a gauge 231 mounted to the body 102.

According to some embodiments, the conveyors 120 are driven via looped belts 232 rather than looped chains 123. In the embodiments shown in FIGS. 5 and 6, the plastic mulch minus the debris is deposited on the ground behind the conveyor for subsequent collection.

However, in alternative embodiments, the plastic mulch retriever 200 can further comprise at least one storage device 126 mounted to the body 102 rearward of the at least two conveyors to store the extracted plastic mulch as described herein. Elongate side members 103, 103A, 103B, 103C can be increased in length to accommodate the storage device(s) and can be hinged as described herein to cause separation of the rollers forming the storage device.

For example, in embodiments where the conveyors 120 are aligned, a single storage device 126 spanning the width of the conveyors can be implemented to store the mulch from multiple conveyors. This addresses the problem of some prior art multi-row mulch retrievers that operate multiple storage devices.

In further alternative embodiments, the plastic mulch retriever 200 can comprise multiple storage devices 126 according to the number of conveyors 120. A storage device can be mounted to the body rearward of a respective one of the conveyors 120 to store the extracted plastic mulch from a respective conveyor. Since each conveyor 120 will be running at the same speed, each storage device can also be driven at the same speed. Furthermore, due to the improved removal of soil and debris from the mulch compared with many of the prior art devices, emptying of multiple storage devices is required less frequently.

It is envisaged that embodiments of the present invention can be used to retrieve buried or partially embedded flexible sheeting material other than plastic mulch. For example, it is envisaged that embodiments of the present invention can be used to retrieve silt fencing that is inserted in the ground to prevent soil erosion.

Advantages of the present invention include the projections 124 of the transverse (rattler) bars 122 engaging and vibrating the plastic mulch to shake free the majority, if not all, of the dirt, earth and soil attached to the mulch before it is deposited on the ground or rolled around the rollers 128. The amount of soil and therefore nutrients removed from the growing area is thus reduced compared with the prior art devices. Passing the plastic mulch 152 first over the rollers 128 after the plastic mulch leaves the conveyor 120 aids in maximising the removal of dirt, earth and soil etc. from the plastic mulch and reduces the likelihood of such debris being trapped in the bundled mulch. Also, the mass of the mulch bundle for disposal is therefore reduced, which in turn reduces the cost of disposal where the cost is based on the mass of the bundle. Furthermore, the amount of mulch that can be captured by the rollers 128 is increased because soil is not attached to the mulch, which would otherwise occupy volume in the bundle. Consequently, fewer interruptions to empty full rollers are experienced with the present invention, thus contributing to overall efficiency. The multiple row versions of the plastic mulch retriever further improve the efficiency of removing plastic mulch from the ground.

Throughout the specification the aim has been to describe the invention without limiting the invention to any one embodiment or specific collection of features. Persons skilled in the relevant art may realize variations from the specific embodiments that will nonetheless fall within the scope of the invention.

What is claimed is:

1. A plastic mulch retriever comprising:
   a body;
   at least one set of cutting or digging elements mounted to the body to loosen plastic mulch embedded in the ground; and
   at least one vibrating conveyor mounted to the body rearward of the at least one set of cutting or digging elements such that a front of the conveyor is just above ground level, the conveyor comprising a plurality of substantially transverse bars comprising a plurality of projections to engage plastic mulch loosened by the cutting or digging elements and remove at least some of the ground material attached to the extracted plastic mulch.

2. The plastic mulch retriever of claim 1, comprising at least two sets of cutting or digging elements mounted to the body and at least two conveyors mounted to the body, each conveyor mounted rearward of a respective set of cutting or digging elements.

3. The plastic mulch retriever of claim 2, wherein one of the sets of cutting or digging elements is mounted to the body adjacent another set of cutting or digging elements.

4. The plastic mulch retriever of claim 2, wherein at least one of the sets of cutting or digging elements is offset in a longitudinal direction with respect to another set of cutting or digging elements.

5. The plastic mulch retriever of claim 2, wherein the at least two conveyors are mounted to the body adjacent each other.

6. The plastic mulch retriever of claim 2, wherein one of the conveyors is offset in a longitudinal direction with respect to an adjacent conveyor.

7. The plastic mulch retriever of claim 1, comprising three sets of cutting or digging elements and three respective conveyors mounted to the body rearward of a respective set of cutting or digging elements.

8. The plastic mulch retriever of claim 7, wherein a central set of cutting or digging elements is offset in a longitudinal direction with respect to the other two sets of cutting or digging elements.

9. The plastic mulch retriever of claim 7, wherein a central conveyor is offset in a longitudinal direction with respect to the other two conveyors.

10. The plastic mulch retriever of claim 1, wherein the at least one set of cutting or digging elements comprises one or more substantially vertically mounted coulter wheels.

11. The plastic mulch retriever of claim 1, wherein the at least one set of cutting or digging elements comprises one or more substantially horizontally mounted angled cutting blades.

12. The plastic mulch retriever of claim 1, wherein the at least one cutting or digging element comprises one or more blades substantially aligned with elongate side members of the body and angled toward the ground.

13. The plastic mulch retriever of claim 2, further comprising at least one storage device mounted to the body rearward of the at least two conveyors to store the extracted plastic mulch.

14. The plastic mulch retriever of claim 2, further comprising at least two storage devices mounted to the body rearward of a respective one of the at least two conveyors to store the extracted plastic mulch from a respective conveyor.

15. The plastic mulch retriever of claim 13, wherein the storage device comprises a pair of rollers rotatably mounted to the body, the pair of rollers releasably connected by a locking mechanism.

16. The plastic mulch retriever of claim 15, wherein the retrieved plastic mulch passes first over the top of the rollers and then underneath the rollers as the plastic mulch is wrapped around the rollers.

17. The plastic mulch retriever of claim 15, wherein a speed of rotation of the rollers is adjustable and is adjusted according to a speed of one of the following: the plastic mulch retriever; a diameter of a bundle of mulch on the rollers.

18. The plastic mulch retriever of claim 1, wherein one or more of the following is adjustable: a position at which the at least one conveyor is mounted to the body; a height of the conveyor relative to the body and the ground; an angle of inclination of the conveyor relative to the body.

19. The plastic mulch retriever of claim 15, wherein the body comprises a pair of spaced apart elongate side members, at least one of the elongate side members being in two parts joined together by a hinge allowing one part to which one of the rollers is mounted to pivot relative to the other part.

20. The plastic mulch retriever of claim 2, wherein the at least two conveyors are driven by a single motor or by a pair of motors, each motor driving a respective conveyor.

* * * * *